Figure 1:
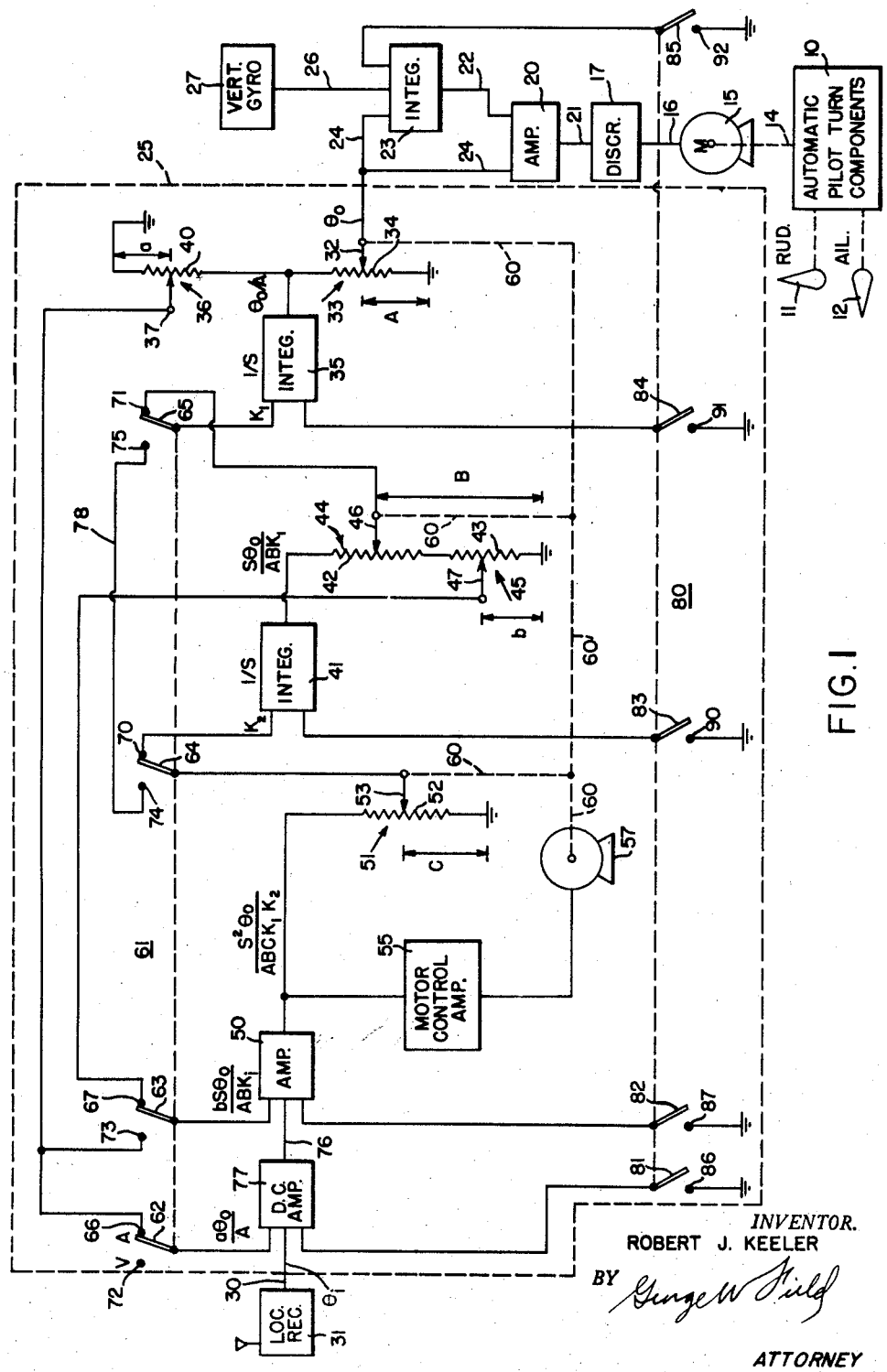

INVENTOR
ROBERT J. KEELER

United States Patent Office 2,944,767
Patented July 12, 1960

2,944,767

AIRCRAFT AUTOMATIC CONTROL APPARATUS HAVING NON-LINEAR CHARACTERISTICS

Robert J. Keeler, Minneapolis, Minn., assignor to Minneapolis-Honeywell Regulator Company, Minneapolis, Minn., a corporation of Delaware Filed Dec. 27, 1954, Ser. No. 477,796

10 Claims. (Cl. 244—77)

This invention relates to the field of telemetric apparatus, and more particularly to means for use in telemetric equipment to differentiate between noise components and intelligence components in signals, so that control can be exercised in accordance with the latter even in the presence of a high percentage of the former.

In electrical telemetric systems the intelligence to be conveyed often takes the form of a voltage which varies in magnitude with a variable being observed. This voltage is conducted from a sensing device of some sort to a utilization device, and it is almost universally true that the signal reaching the utilization device includes not only the intelligence voltage but other components not representative of changes in the variable: these components are called "noise" components and they interfere with proper operation of the telemetric system.

The changes in the variable are generally not sinusoidal, but they can be considered as made up of frequencies extending through a band. Similarly, the noise components are found to occupy a band of frequencies. It is ordinarily the case that the intelligence frequency band is considerably narrower than the noise frequency band, and may have a much lower mean value.

It has previously been proposed to provide a "perception filter" for interposition between the sensing device and the utilization device to discriminate against the noise frequency components in proportion to their magnitude. The present invention comprises an improvement on one such arrangement, and is disclosed in use to improve the operation of blind landing equipment for aircraft.

An object of the invention is to provide an improved telemetric system including a second order closed loop filter having means for varying a parameter of the filter in accordance with the noise components of a signal supplied thereto: the parameter varied may be the natural frequency of the filter or its overall gain, or both of these parameters may be varied.

A more specific object of the invention is to provide blind landing apparatus for controlling the movements of a craft in azimuth with respect to a desired path, which includes a telemetric system as just described.

A further specific object of the invention is to provide a perception filter giving two signals in which there predominate respectively the low and the high frequency components of an input to the filter, the filter including moreover means for varying one or more of its parameters in accordance with the second signal.

Various other objects, advantages, and features of novelty not particularly enumerated above which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

Figure 2:
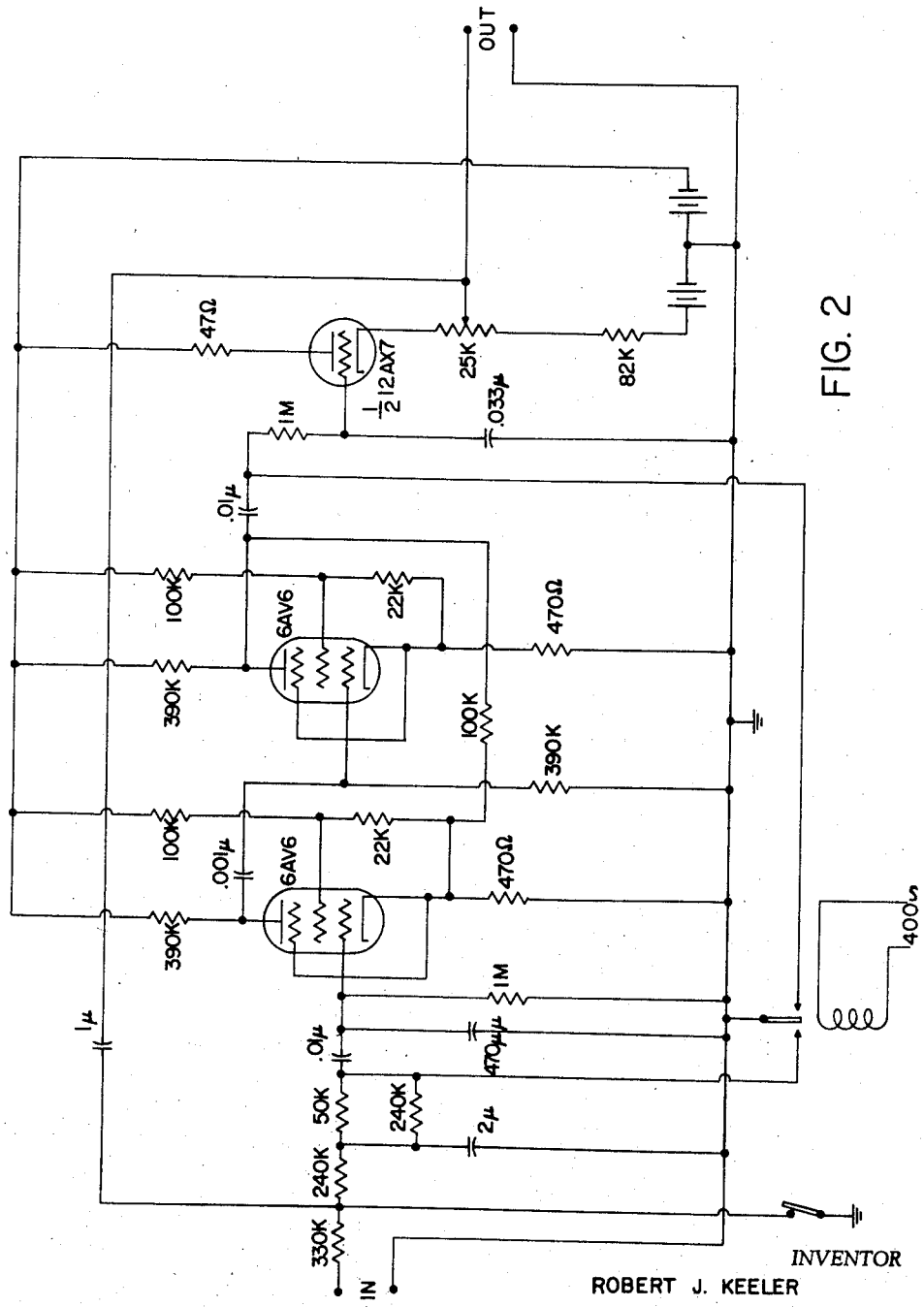

In the drawing Figure 1 illustrates schematically a blind landing apparatus including a perception filter of the improved type, and Figure 2 is a wiring diagram of a conventional integrator useful in improved perception filters.

In the drawing, reference numeral 10 indicates the azimuth control components of an automatic pilot for an aircraft, which operate to control the rudder 11 and ailerons 12 of the craft in such a fashion as to normally maintain it in flight on a given heading. Means indicated by the dotted line 14 are provided whereby operation of the automatic pilot may be affected by an external agency, here shown as motor 15, although the connection to the automatic pilot may be electrical as well as mechanical. Motor 15 is energized through a cable 16 from a discriminator 17 energized in turn from an amplifier 20 through a cable 21. A first input 22 is supplied to amplifier 20 from a first integrator 23, and a second input 24 is supplied to amplifier 20 from the output of a perception filter indicated by the general reference character 25. Input 24 is supplied to integrator 23, together with a second input 26 proportional to the bank of the aircraft, derived from a vertical gyroscope 27 which may actually perform other functions in connection with automatic pilot 10.

Turning to the left of the figure, an input 30 is supplied to perception filter 25 from a localizer receiver 31. This input varies in accordance with the departure of the aircraft from a particular path set up in space by the localizer transmitter of the well-known Instrument Landing System.

The output signal supplied at 24 to amplifier 20 and integrator 23 is derived between ground and the slider 32 of a voltage divider 33 having a winding 34 energized with the output of a second integrator 35. The integrator has a transfer function $$\frac{K_1}{S}$$

where $K_1$ is the D.C. gain of the integrator and $$\frac{1}{S}$$

defines integration in LaPlace transform terminology. Also energized with the output of integrator 35 is a second voltage divider 36 having a slider 37 and a winding 40.

Also included in perception filter 25 is a third integrator 41 having a transfer function $$\frac{K_2}{S}$$

$K_2$ being the D.C. gain thereof, and supplying its output to the series connected windings 42 and 43 of a pair of voltage dividers 44 and 45 having sliders 46 and 47 respectively.

An amplifier 50 having a transfer characteristic of 1 is shown to energize a further voltage divider 51 having a winding 52 and a slider 53, and also to supply a signal to a motor control amplifier 55 to drive a motor 57. The shaft 60 of motor 57 is connected to the sliders 53, 46 and 32 of voltage dividers 51, 44 and 33, all respectively.

In the upper portion of the drawing there is shown a switch generally indicated by the reference numeral 61, having a plurality of movable contacts 62, 63, 64 and 65 which are operable out of normal engagement with a plurality of fixed contacts 66, 67, 70 and 71 and into engagement with a further set of contacts 72, 73, 74 and 75. Fixed contacts 74 and 75 are interconnected by a conductor 78.

Amplifier 50 is provided with an input 76 from a second, D.C. amplifier 77, and with a second input from the movable contact 63 of switch 61. In the same way, D.C. amplifier 77 is provided with a first input 30 from localizer receiver 31, and with a second input from movable contact 62 of switch 61. The transfer function of unit 77 may also be 1.

In the bottom of the figure there is shown a switch identified by the general reference character 80 and shown to comprise a normally open, five pole, single throw switch including movable contacts 81, 82, 83, 84 and 85 and fixed contacts 86, 87, 90, 91 and 92, the latter five contacts being grounded. It will be understood that instead of using a five pole switch, a larger number of switches having a lesser number of poles may be used if this is desired.

For purposes of clarity in the following discussion, the voltage between slider 32 and ground is identified by A, that between slider 37 and ground is indicated by $a$, that between slider 46 and ground is indicated by B, that between slider 47 and ground is indicated by $b$, and that between slider 53 and ground is indicated by C. The output from the perception filter is indicated by $\theta_0$, and the input thereto by $\theta_1$.

The normal position of switch 61 is that shown in the figure. When the switch is in this position the slider 37 is connected to supply an input to D.C. amplifier 77, and slider 47 is connected to supply an input to amplifier 50. Amplifiers 50 and 77 together comprise a summing arrangement for adding to the input desired feedback voltages: at the same time the output of voltage divider 51 is supplied as an input to integrator 41, and the output of voltage divider 44 is supplied as an input to integrator 35.

From elementary servo theory certain relations are now apparent. If the output of slider 32 is $\theta_0$, the full output from integrator 35 must be $$\frac{\theta_0}{A}$$

and the output from slider 37 must be $$\frac{a\theta_0}{A}$$

The input to integrator 35 must be $$\frac{S\theta_0}{AK_1}$$

and the output from integrator 41 must be $$\frac{S\theta_0}{ABK_1}$$

so that the output from slider 47 is $$\frac{bS\theta_0}{ABK_1}$$

The input to integrator 41 is $$\frac{S^2\theta_0}{ABK_1K_2}$$

and the signal $\epsilon$ from amplifier 50 must be $$\frac{S^2\theta_0}{ABCK_1K_2}$$

The transfer function $$\frac{\theta_0}{\theta_1}$$

of the entire perception filter is $$\frac{ABCK_1K_2}{S^2+bCK_2S+aBCK_1K_2}$$

from this it follows that the D.C. gain of the filter is $$\frac{A}{a}$$

and is independent of B and C. The natural frequency of the filter, $\omega_n$, is defined by $\omega_n^2 = aBCK_1K_2$, and the damping factor by the equation $$2\zeta = b\sqrt{\frac{CK_2}{aBK_1}}$$

In setting up the apparatus the sliders 37 and 47 are so set, with respect to the values of $K_1$ and $K_2$, that $B=C=1$ for a desired natural frequency $\omega_n$, and thereafter $\omega_n$ subsequently varies in direct proportion to signal changes in B and C: since these are changed simultaneously, no change in the damping factor results. In one operative embodiment of the invention a natural frequency of one cycle per second and a damping factor of 0.7 were found satisfactory. The intelligence frequencies in aircraft control were found to extend as high as one cycle per second, and the noise frequencies extended much higher.

The expression for the signal from amplifier 50 indicates that the voltage at this point is the second derivative of the output voltage from integrator 35. By suitably selecting the natural frequency of the filter with the frequencies of the intelligence and noise components of the signal in mind, there results a system in which $\theta_0$ represents predominantly the signal components, while $\epsilon$ represents predominantly the noise components.

This is inherent in the apparatus used. The effect of each of integrators 41 and 35 is to emphasize the lower frequencies of its input more than the higher frequencies, and the integrator outputs are in part fed back to oppose the inputs, thus suppressing the low frequency components thereof. The signal from amplifier 50 and the output from integrator 35 thus differ markedly in their frequency content, that from the integrator being so predominantly low frequency that it can be said to be representative of the intelligence component of the input and to be substantially independent of its noise component, and that from the amplifier being so predominantly high frequency that it can be said to be representative of the noise component of the input and to be substantially independent of the intelligence component.

The signal $\epsilon$ is used to control the operation of motor 57, which thus positions sliders 53, 46 and 32 substantially solely in accordance with the noise components of the signal. From what has been stated it follows that the overall gain and the natural frequency of the filter are varied in accordance with the amount of noise in the signal. Either of these filter parameters may be adjusted separately if desired, but I have found that simultaneous adjustment gives the more stable operation.

When switch 61 is thrown to its other position, integrator 41 and voltage dividers 44 and 45 are cut out of the system, the voltage from slider 37 is fed to amplifier 50, and no additional signal is added to amplifier 77. The system now degenerates into a first order closed loop filter, and the expressions "natural frequency" and "damping ratio" no longer have exact meaning. It can be said with some approximation, however, that motor 57 runs in proportion to the first derivative of the output signal $\theta_0$. While a system so constructed is less efficient than the second order system, it is simpler and cheaper, and offers these advantages where it can be used.

Figure 2 is a wiring diagram of one type of integrator suitable for use at 23, 35 and 41. The integrator is a conventional feedback amplifier resistance-capacitance integrator, and typical component values are shown in the figure.

*Operation*

The operation of the systems presumes that $K_1K_2$ have been selected and $a$ and $b$ have been set, for $B=C=1$, to give a desired natural frequency and damping ratio. Switches 80 and 61 are assumed to be as shown. A signal $\theta_1$ is supplied at 30 by localizer receiver 31, added in amplifier 77 to the signal on slider 37 and the sum added in amplifier 50 to the signal from slider 47. The signal from amplifier 50 is supplied through integrators 41 and 35 and appears as output $\theta_0$: it also controls the operation of motor 57 to adjust sliders 53, 46 and 32, thus accomplishing maximum suppression of the noise components in the output $\theta_0$. This output is supplied to integrator 23, with the bank signal from vertical gyroscope 27, and their integral is added in amplifier 20 to the unintegrated output $\theta_0$. Motor 15 modifies the operation of the automatic pilot 10 in accordance with the output of amplifier 20, so as to return the aircraft to the desired path if it departs therefrom.

When a given approach has been completed, or if it is desired to initiate a different approach, closure of switch 80 for a sufficient interval of time allows for all the integrators to return to their starting conditions.

The same general operation takes place with somewhat less exactitude, if switch 61 is thrown to the left, or if equipment is used which does not include an integrator with voltage dividers corresponding to members 41, 44 and 45.

Numerous objects and advantages of my invention have been set forth in the foregoing description, together with details of the structure and function of the invention, and the novel features thereof are pointed out in the appended claims. The disclosure however is illustrative only, and I may make changes in detail within the principle of the invention to the full extent indicated by the broad general meaning of the terms in which the appended claims are expressed.

I claim as my invention:

1. Apparatus of the class described comprising, in combination: means supplying an input signal having an intelligence component of relatively low frequencies and a noise component, of relatively high frequencies, which may instantaneously exceed the intelligence component; summing means for giving a second signal determined by the sum of three inputs; a filter including first and second integrators, first adjustable connecting means energizing the second integrator with the output of the first integrator, second adjustable connecting means energizing the first integrator with said second signal, and adjustable third means supplying said input signal and the outputs of said integrators to comprise the three inputs to said summing means; motor means connected to said summing means for actuation in accordance with said second signal; means connecting said motor means to said first and second connecting means for adjusting the same; and output means connected for energization from said second integrator.

2. Apparatus of the class described comprising, in combination: means supplying an input signal having an intelligence component of relatively low frequencies and a noise component, of relatively high frequencies, which may instantaneously exceed the intelligence component; adjustable means giving an output in which the lower frequency components of an input signal predominate, and a second signal, in which the high frequency components of the input signal predominate; and means connected to said adjustable means for adjusting said adjustable means in accordance with said second signal.

3. Apparatus of the class described comprising, in combination: radio means giving an input signal in accordance with departure of a craft from a chosen path, said signal having an intelligence component of relatively low frequencies and a noise component, of relatively high frequencies, which may instantaneously exceed the intelligence component; control means for adjusting the heading of the craft in accordance with an input supplied thereto; an adjustable perception filter giving an output in which low frequencies of an input predominate and a second signal in which high frequencies of the input predominate; means in said filter for adjusting the natural frequency thereof in accordance with said second signal; and means connecting said filter to said radio means and said control means so that said input signal comprises the input to said filter, and so that said output is supplied as an input to said control means.

4. Apparatus of the class described comprising, in combination: radio means giving an input signal in accordance with departure of a craft from a chosen path, said signal having an intelligence component of relatively low frequencies and a noise component, of relatively high frequencies, which may instantaneously exceed the intelligence component; control means for adjusting the heading of the craft in accordance with an input supplied thereto; an adjustable perception filter giving an output in which low frequencies of an input predominate and a second signal in which high frequencies of the input predominate; means in said filter for adjusting a parameter thereof in accordance with said second signal; and means connecting said filter to said radio means and said control means so that said input signal comprises the input to said filter, and so that said output is supplied as an input to said control means.

5. Apparatus of the class described comprising, in combination: radio means giving an input signal in accordance with departure of a craft from a chosen path, said signal having an intelligence component of relatively low frequencies and a noise component, of relatively high frequencies, which may instantaneously exceed the intelligence component; control means for adjusting the heading of the craft in accordance with an input supplied thereto; an adjustable perception filter giving an output in which low frequencies of an input predominate and a second signal in which high frequencies of the input predominate; means in said filter for adjusting the overall gain thereof in accordance with said second signal; and means connecting said filter to said radio means and said control means so that said input signal comprises the input to said filter, and so that said output is supplied as an input to said control means.

6. Apparatus of the class described comprising, in combination: radio means giving an input signal in accordance with departure of a craft from a chosen path, said signal having an intelligence component of relatively low frequencies and a noise component, of relatively high frequencies, which may instantaneously exceed the intelligence component; control means for adjusting the heading of the craft in accordance with an input supplied thereto; an adjustable perception filter giving an output in which low frequencies of an input predominate and a second signal in which high frequencies of the input predominate; means in said filter for adjusting the natural frequency and overall gain thereof in accordance with said second signal; and means connecting said filter to said radio means and said control means so that said input signal comprises the input to said filter, and so that said output is supplied as an input to said control means.

7. Apparatus of the class described comprising, in combination: summing means giving a first signal determined by the sum of three inputs thereto; a first adjustable gain control connected to said summing means to receive said first signal; a first integrator; second and third adjustable gain controls on the output of said first integrator; means connecting said first gain control to said first integrator to supply a signal thereto; a second integrator; fourth and fifth adjustable gain controls on the output of said second integrator; means connecting said second gain control to said second integrator to supply a signal thereto; means connecting said third and fourth gain controls to said summing means to provide two of the inputs thereto; motor means connected to said summing means for adjusting said first and second gain controls in accordance with said first signal; means connected to said summing means to supply an input signal as the third input to said summing means; and means including said fifth gain control for supplying an output from said second integrator.

8. Apparatus of the class described comprising, in combination: summing means giving a first signal determined by the sum of three inputs thereto; a first adjustable gain control connected to said summing means to receive said first signal; a first integrator; second and third adjustable gain controls on the output of said first integrator; means connecting said first gain control to said first integrator to supply a signal thereto; a second integrator; a fourth adjustable gain control on the output of said second integrator; means connecting said second gain control to said second integrator to supply a signal thereto; means connecting said third and fourth gain controls to said summing means to provide two inputs thereto; motor means connected to said summing means for adjusting said first and second gain controls in accordance with said first signal; means connected to said summing means to supply an input signal as the third input to said summing means; and means for supplying an output from said second integrator.

9. Apparatus of the class described comprising, in combination: summing means giving a first signal determined by the sum of the inputs thereto; a first adjustable gain control connected to said summing means to receive said first signal; an integrator; second and third adjustable gain controls on the output of said integrator; means connecting said first gain control to said integrator to supply a signal thereto; means connecting said third gain control to said summing means to provide a first input thereto; motor means connected to said summing means for adjusting said first and second gain controls in accordance with said first signal; means connected to said summing means to supply an input signal as the second input to said summing means; and means including said second gain control for supplying an output from said integrator.

10. Apparatus of the class described comprising, in combination: summing means giving a first signal determined by the sum of three inputs thereto; a first adjustable gain control connected to said summing means to receive said first signal; a first integrator; second and third adjustable gain controls on the output of said first integrator; means connecting said first gain control to said first integrator to supply a signal thereto; a second integrator; fourth and fifth adjustable gain controls on the output of said second integrator; means connecting said second gain control to said second integrator to supply a signal thereto; means connecting said third and fourth gain controls to said summing means to provide two inputs thereto; motor means connected to said summing means for adjusting said first, second and fifth gain controls in accordance with said first signal; means connected to said summing means to supply an input signal as the third input to said summing means; and means including said fifth gain control for supplying an output from said second integrator.

References Cited in the file of this patent

UNITED STATES PATENTS

| | | |
|---|---|---|
| 2,489,248 | Abraham | Nov. 29, 1949 |
| 2,589,723 | Miller | Mar. 18, 1952 |
| 2,624,796 | Saunders | Jan. 6, 1953 |
| 2,655,627 | McWade | Oct. 13, 1953 |
| 2,663,765 | De Boisblanc | Dec. 22, 1953 |
| 2,682,051 | Fisher | June 22, 1954 |
| 2,687,580 | Dehmel | Aug. 31, 1954 |
| 2,708,258 | Westwood | May 10, 1955 |
| 2,717,132 | Cooper | Sept. 6, 1955 |
| 2,759,137 | Kutzler | Aug. 14, 1956 |
| 2,775,421 | Markusen | Dec. 25, 1956 |
| 2,776,428 | Hassler et al. | Jan. 1, 1957 |
| 2,784,924 | Gille | Mar. 12, 1957 |

OTHER REFERENCES

"Servomechanisms and Regulating System Design," vol. 1, 1951, Chestnut and Mayer, pub. by J. Wiley & Sons, Inc., New York.